United States Patent
Gishi et al.

(10) Patent No.: US 6,942,348 B2
(45) Date of Patent: Sep. 13, 2005

(54) PROJECTOR DEVICE

(75) Inventors: Hiromitsu Gishi, Higashiosaka (JP); Fumihiko Hamada, Kobe (JP); Shoji Okazaki, Higashiosaka (JP); Takaharu Adachi, Daito (JP); Taichi Yoshimura, Higashiosaka (JP); Naoyuki Uchiyama, Gunma (JP); Mitsuhiro Masuda, Osaka (JP); Michihiro Kurokawa, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/995,206

(22) Filed: Nov. 24, 2004

(65) Prior Publication Data

US 2005/0088628 A1 Apr. 28, 2005

Related U.S. Application Data

(62) Division of application No. 10/473,146, filed as application No. PCT/JP02/06203 on Jun. 21, 2002, now Pat. No. 6,837,583.

(30) Foreign Application Priority Data

| Jun. 21, 2001 | (JP) | 2001-187854 |
| Jun. 21, 2001 | (JP) | 2001-187855 |
| Jun. 21, 2001 | (JP) | 2001-187856 |
| Jun. 21, 2001 | (JP) | 2001-187857 |
| Jun. 21, 2001 | (JP) | 2001-187858 |

(51) Int. Cl.$^7$ ............... G03B 21/14; G03B 21/16; G03B 21/18; G03B 21/22
(52) U.S. Cl. ............... 353/58; 353/60; 353/61; 353/119
(58) Field of Search ............... 353/20, 31, 52, 353/57, 58, 60, 61, 119; 349/5

(56) References Cited

U.S. PATENT DOCUMENTS

| 6,280,036 B1 | 8/2001 | Suzuki | 353/31 |
| 6,398,366 B1 | 6/2002 | Hara et al. | 353/57 |
| 6,494,581 B2 | 12/2002 | Shimizu | 353/61 |
| 2003/0071977 A1 | 4/2003 | Miyamoto et al. | 353/52 |

FOREIGN PATENT DOCUMENTS

| JP | 6-14485 | 2/1994 |
| JP | 8-22075 | 1/1996 |
| JP | 8-114857 | 5/1996 |
| JP | 10-186517 | 7/1998 |
| JP | 10-254061 | 9/1998 |
| JP | 10-325982 | 12/1998 |
| JP | 11-195402 | 7/1999 |
| JP | 2000-194071 | 7/2000 |
| JP | 2000-231154 | 8/2000 |
| JP | 2001-13589 | 1/2001 |
| JP | 2001-76505 | 3/2001 |
| JP | 2001-132694 | 5/2001 |
| JP | 2001-133885 | 5/2001 |
| JP | 2001-183746 | 7/2001 |
| JP | 2002-341448 | 11/2002 |

*Primary Examiner*—Judy Nguyen
*Assistant Examiner*—Melissa J. Koval
(74) *Attorney, Agent, or Firm*—Armstrong, Kratz, Quintos, Hanson & Brooks, LLP

(57) ABSTRACT

A projector device adapted to project an image-forming beam using a lamp as a light source. The lamp is installed within a rectangular parallelepipedal housing, and an exhaust fan is disposed to the rear of the lamp. The top wall of the housing surrounding the lamp is given an opening pattern asymmetric about the optical axis of the lamp by forming an air inlet opening in a position deviated from the optical axis toward a direction orthogonal to the axis for producing a swirling air current within the housing by operating the exhaust fan. The lamp can be effectively cooled with reduced quantities of air.

2 Claims, 12 Drawing Sheets

PROJECTOR DEVICE

This application is a Divisional application of U.S. patent application Ser. No. 10/473,146, filed Oct. 8, 2003, now U.S. Pat. No. 6,837,583, which is a U.S. National Stage application of PCT/JP02/06203, filed Jun. 21, 2002.

BACKGROUND OF THE INVENTION

1. Field of the Invention

The present invention relates to projector devices, such as liquid crystal projectors, for projecting an image-forming beam on a screen using a lamp as a light source.

2. Description of the Related Art

Projector devices of the type mentioned comprise as arranged in a casing a lamp unit, and an optical system including a polarization beam splitter, polarizing plates, liquid crystal panels, a projection lens, etc. The lamp unit has a mercury lamp disposed within a housing and an exhaust fan disposed to the rear of the mercury lamp. Air streams are produced around the mercury lamp by operating the exhaust fan for cooling the lamp.

However, with high-luminance projector devices wherein a superhigh-pressure mercury lamp is used as the light source, the mercury lamp generates a large quantity of heat and therefore requires high-speed rotation of the exhaust fan to produce air streams at a high speed and fully cool the lamp. This entails the problem that the exhaust fan makes a great noise.

An object of the present invention is to provide a projector device wherein the light-source lamp can be effectively cooled with reduced quantities of air streams.

SUMMARY OF THE INVENTION

The present invention provides a projector device wherein a lamp unit 4 comprises a lamp 5 disposed within a rectangular parallelepipedal housing 41 and an exhaust fan 40 disposed to the rear of the lamp 5. At least one of four peripheral walls of the housing 41 surrounding the lamp 5 is given an opening pattern asymmetric about the optical axis of the lamp 5 by forming at least one air inlet opening in a position deviated from the optical axis toward a direction orthogonal to the axis.

With the projector device of the invention described, the air drawn into the housing 41 through the air inlet opening from outside the housing 41 flows toward a direction deviated from the optical axis of the lamp 5, producing a swirling current within the housing 41. This effects enhanced heat transfer between the outer peripheral surface of the lamp 5 and the swirling current to effectively cool the lamp 5 with the air.

Stated specifically, the exhaust fan 40 is an axial-flow fan. This produces an air current revolving around the lamp 5 inside the housing 41. When the above-mentioned at least one air inlet opening is positioned as deviated from the optical axis toward a direction along the direction of rotation of the exhaust fan 40, the direction of swirling air as drawn into the housing 41 from outside matches the direction of a swirling force given to the air current by the rotation of the exhaust fan 40 to assist in the flow of swirling air around the lamp 5.

Further stated more specifically, a cooling unit 6 is disposed along an optical system of the device, and the cooling unit 6 has one or a plurality of intake windows for drawing in outside air, one or a plurality of cooling fans for drawing in outside air through the intake window or windows and discharging the air, a plurality of air discharge ports facing toward respective high-temperature portions of the optical system, and a channel network 8 for guiding the air discharged from the cooling fan or fans to the air discharge ports, the channel network 8 comprising a plurality of channels for distributing the air to be forced out of the air discharge ports toward the respective high-temperature portions of the optical system in quantities in accordance with the temperature of the high-temperature portions.

The cooling unit 6 has air discharge ports facing toward the high-temperature portions of the optical system, and a channel network 8 comprising a plurality of channels extending from the discharge opening or openings of one or the plurality of cooling fans to the respective air discharge ports, so that, due to the operation of the cooling fan, the outside air drawn in through the intake window or windows is forced out from the respective air discharge ports directly against the high-temperature portions of the optical system to concentrically cool these portions of the system. Since the channels of the channel network 8 are adjusted, for example, in cross sectional area thereof so as to distribute the air to be forced out of the air discharge ports toward the respective high-temperature portions of the optical system in quantities in accordance with the temperature of the high-temperature portions, the high-temperature portions are cooled to a substantially uniform temperature. This ensures sufficient cooling with smaller quantities of air than the prior art wherein air is merely caused to flow within the casing for cooling the entire optical system.

Further stated more specifically, the casing 1 has at least one intake for drawing in air from outside, at least one air discharge opening for forcing out air toward the optical system, and an air channel partitioned from the inside space of the casing and extending from the intake to the air discharge opening, a cooling fan being provided in the air channel so that only the air drawn in through the intake from outside the casing is forced out of the air discharge opening against the optical system to thereby cool the optical system.

With this specific construction, the intake faces toward the outside of the casing, and the air channel extending from the intake to the air discharge opening is partitioned from the casing inside space (wherein the optical system is installed), so that the operation of the cooling fan draws in air of low temperature from outside the casing through the intake, forcing the air of low temperature drawn in against the optical system without permitting the air to be mixed with the air of high temperature inside the casing. The optical system is therefore fully cooled.

Further stated more specifically, the lamp 5 of the lamp unit 4 comprises a reflector 51, a light-producing portion 50 disposed at the focal position of the reflector 51 or in the vicinity thereof, and a light-transmitting plate 53 covering a front opening of the reflector 51, the lamp unit 4 having an air intake 52 for guiding air from outside the lamp 5 toward the light-producing portion 50 and an air outlet 54 for leading out the air guided in through the air intake 52 to the outside of the lamp 5, a blower fan 44 being connected to the air intake 52 by a duct 47 to forcibly cool the light-producing portion 50 with air by operating the blower fan 44.

With this specific construction, the operation of the blower fan 44 forces air directly against the light-producing portion 50 of the lamp 5 which portion has the highest temperature, whereby the portion 50 is forcibly cooled. Since the reflecting surface of the reflector 51 surrounding the light-producing portion 50 is an inwardly curved surface, an air stream flowing along the inwardly curve surfaces, i.e., an air stream swirling around the light-producing portion 50, is created, giving an increased coefficient of heat transfer to the surface of the light-producing portion 50. This ensures effective cooling with a smaller quantity of air than the prior art wherein an air stream is produced around the reflector.

Further stated more specifically, the air channel extending from the intake of the casing 1 to the air discharge opening thereof has installed therein as the cooling fan a sirocco fan of one-side suction type having an intake opening in only one side thereof, with above-mentioned one side positioned at the greatest possible distance away from, and opposed to, a wall of the air channel, and a space provided between above-mentioned one side and the air channel wall is in communication with the intake.

The sirocco fan of one-side suction type used as the cooling fan in this arrangement can be smaller in thickness than sirocco fans of two-side suction type. As a result, the side of the fan provided with an intake opening can be a sufficient distance away from the air channel wall to which the intake side is opposed, providing a large space between the intake side and the air channel wall. Accordingly, the channel extending from the intake to the air discharge opening of the sirocco fan via the space can be given a sufficiently large cross sectional area, which greatly reduces the flow resistance (pressure loss) to be offered to the air flowing through this channel. As a result, a sufficient quantity of air is available even if the sirocco fan has a low output, hence a reduced noise.

Thus, with the projector device of the present invention, more efficient heat transfer is ensured between the outer peripheral surface of the lamp 5 of the lamp unit 4 and the swirling air current to effectively cool the lamp 5 with the air.

BEST MODE OF CARRYING OUT THE INVENTION

With reference to the drawings, a detailed description will be given below of the present invention as embodied into a liquid crystal projector.

Overall Construction

Figure 1:
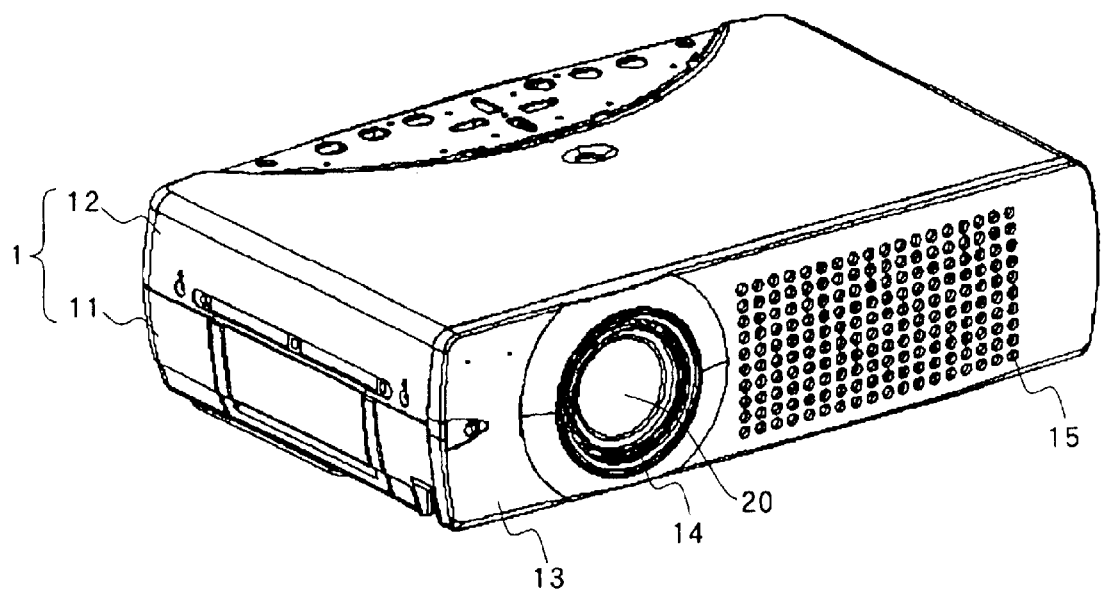
FIG. 1 is a perspective view of a liquid crystal projector according to the invention.

The present invention provides a liquid crystal projector, which has a flat casing 1 comprising a lower half case 11 and an upper half case 12 as shown in FIG. 1. The casing 1 has a front panel 13 provided with a projection window 14 and vents 15 for the hot air discharged from a lamp unit 4 housed in the casing.

Figure 3:
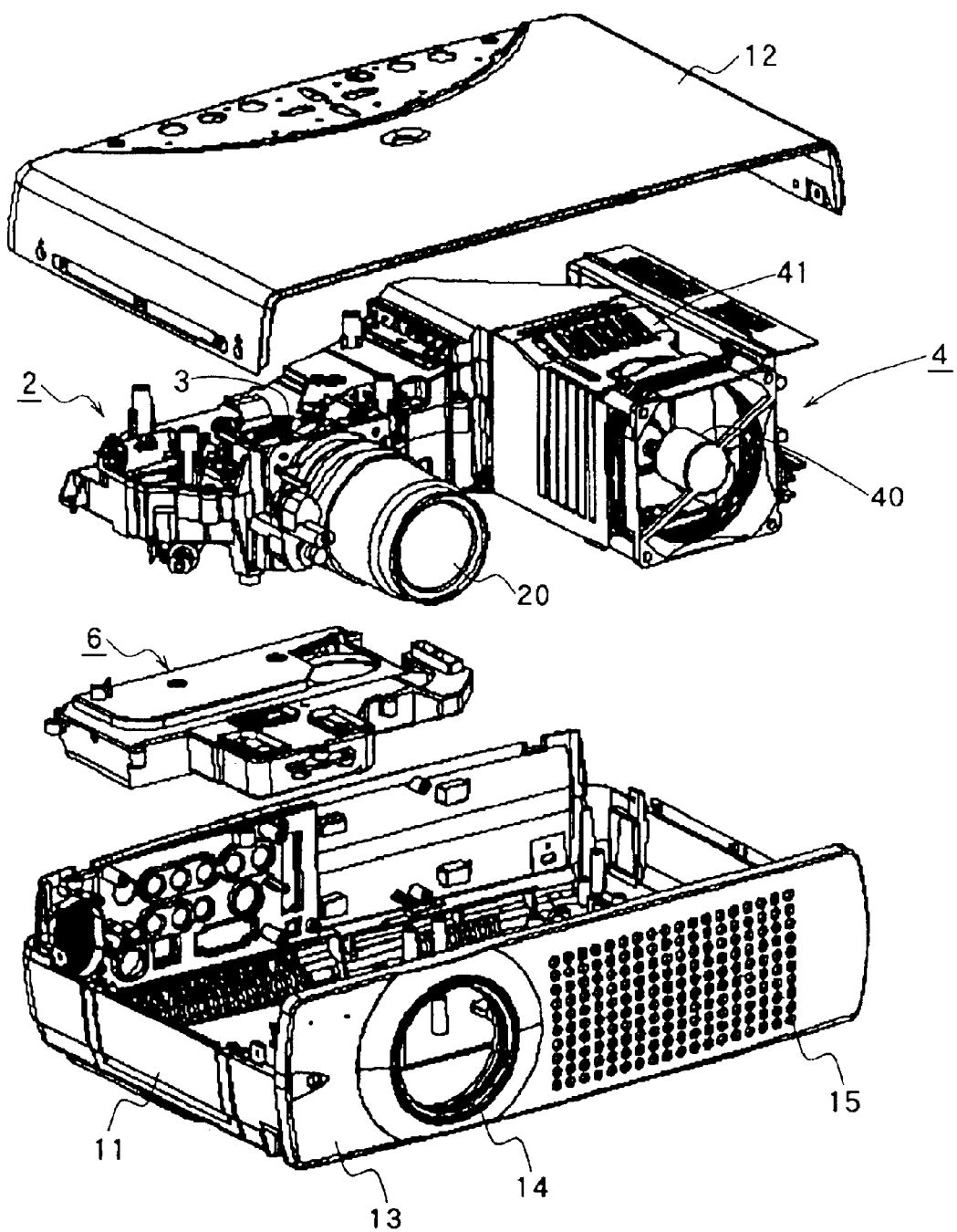
FIG. 3 is an exploded perspective view of the liquid crystal projector.
Figure 4:
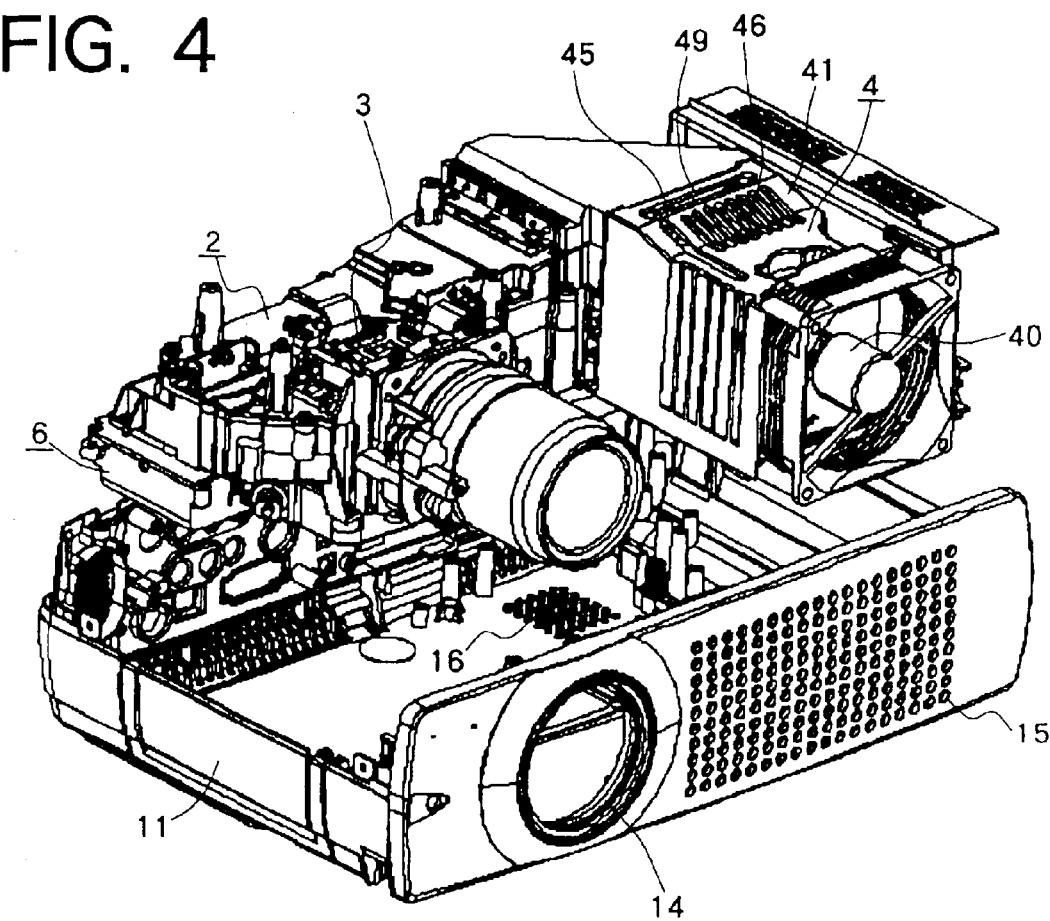
FIG. 4 is a perspective view showing the liquid crystal projector, with the lamp unit, the optical unit and a cooling unit removed from a lower half case.
Figure 5:
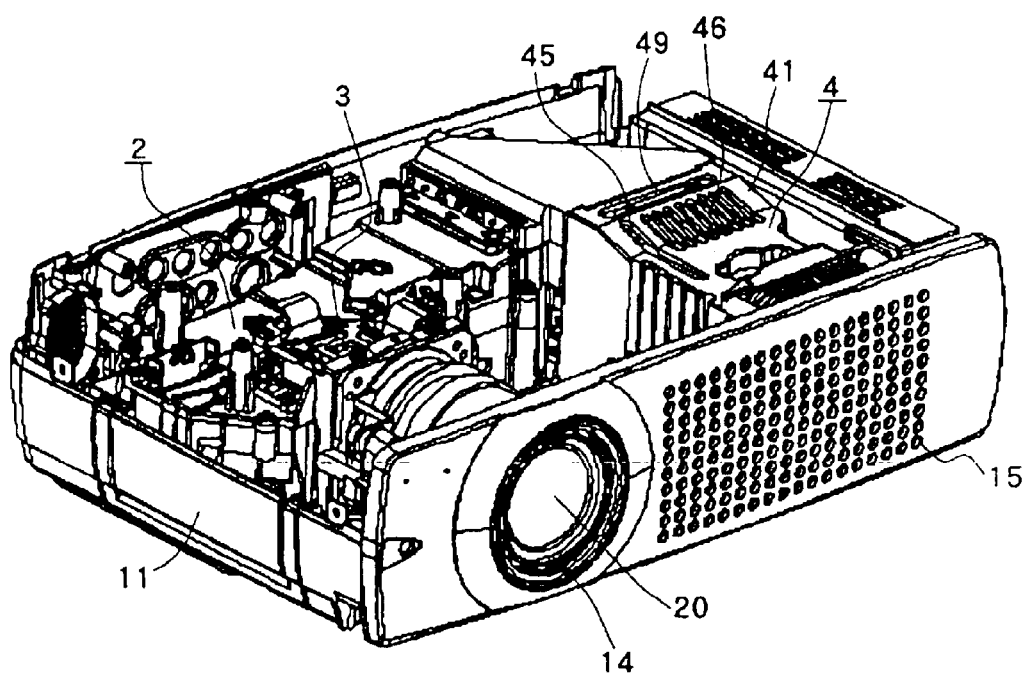
FIG. 5 is a perspective view showing the liquid crystal projector, with the lamp unit, the optical unit and the cooling unit arranged into an assembly as housed in the lower half case.

As shown in FIGS. 3 to 5, arranged inside the casing 1 are an optical unit 2 for producing a color image-forming beam, the lamp unit 4 serving as a light source for the optical unit 2, and a cooling unit 6 for cooling the optical unit 2.

Optical Unit 2

Figure 2:
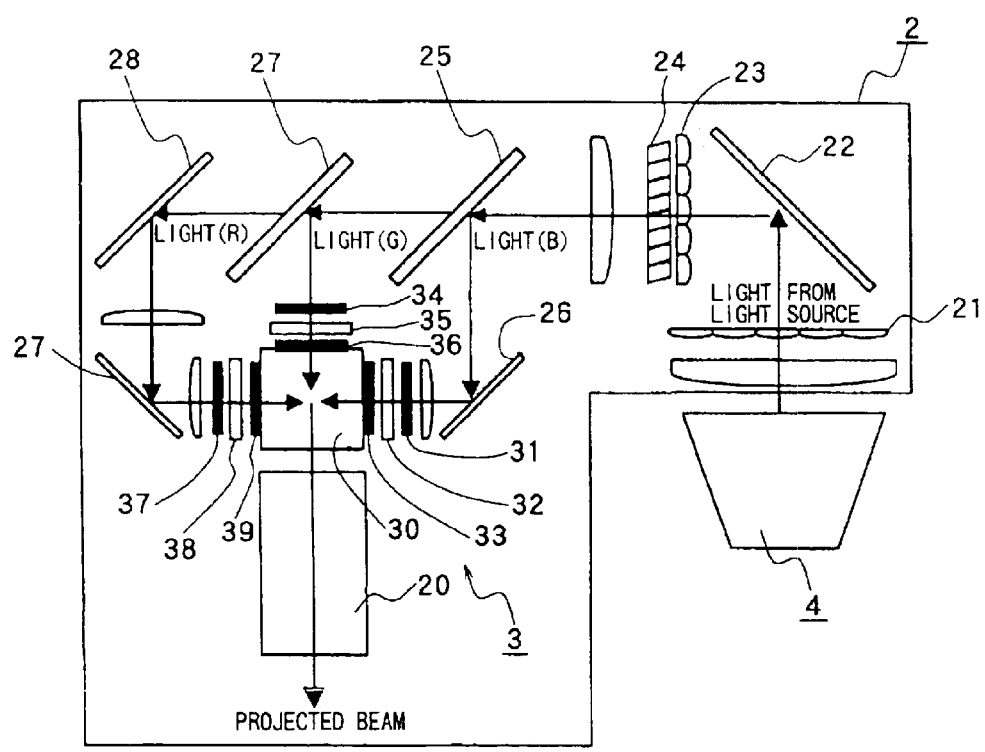
FIG. 2 is a diagram showing the constructions of a lamp unit and an optical system which are included in the liquid crystal projector.

With reference to FIG. 2, the optical unit 2 guides white light from the lamp unit 4 to a two-color separating mirror 25 for blue by way of a first integrator 21, first mirror 22, second integrator 23 and polarization beam splitter 24 to thereby separate off blue light. The light passing through the two-color separating mirror 25 for blue is guided to a two-color separating mirror 27 for green to thereby separate off green light.

The blue light separated off by the separating mirror 25 for blue impinges on a color composition device 3 via a second mirror 26. The green light separated off by the separating mirror 27 for green is incident on the color composition device 3, and red light is incident on the color composition device 3 via a third mirror 28.

The blue light incident on the color composition device 3 is led through an incidence polarizing plate 31 for blue, liquid crystal panel 32 for blue and emergence polarizing plate 33 for blue of the device 3 to a color composition prism 30. The green light incident on the color composition device 3 is led through an incidence polarizing plate 34 for green, liquid crystal panel 35 for green and emergence polarizing plate 36 for green of the device 3 to the color composition prism 30. The red light incident on the color composition device 3 is led through an incidence polarizing plate 37 for red, liquid crystal panel 38 for red and emergence polarizing plate 39 for red of the device 3 to the color composition prism 30.

The image-forming beams of three colors led to the color composition prism 30 are combined by the prism, and the resulting color image-forming beam is led through a projection lens 20 and projected on a screen in the front upon enlargement.

Lamp Unit 4

Figure 7:
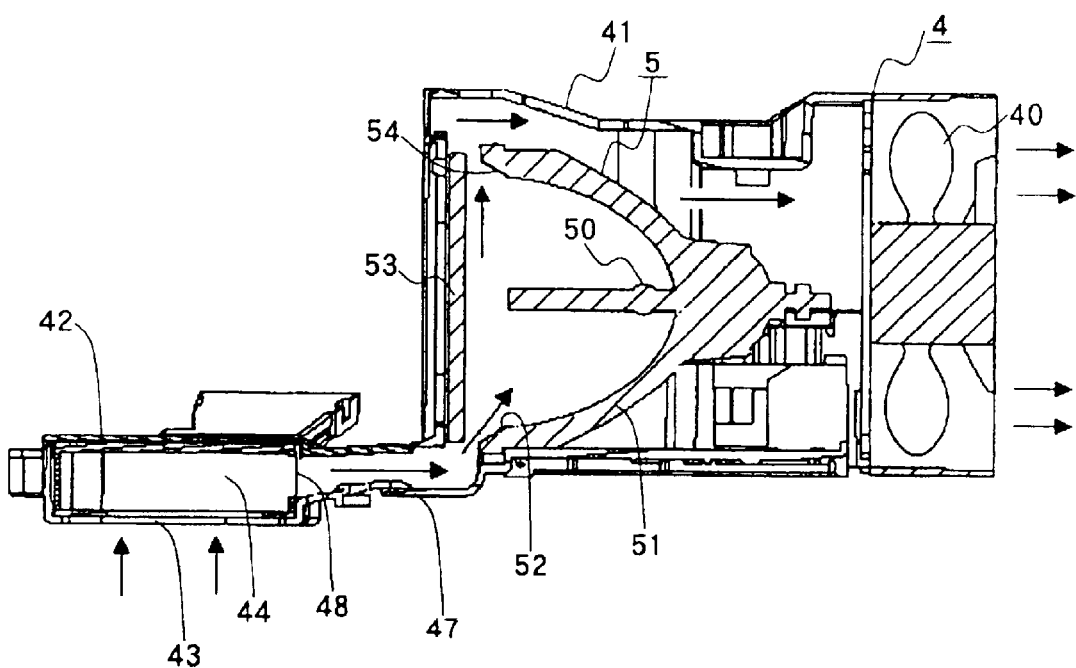
FIG. 7 is a view in section of the lamp unit.

As shown in FIG. 7, the lamp unit 4 comprises a superhigh-pressure mercury lamp 5 provided within a housing 41. An exhaust fan 40 is disposed to the rear of the lamp 5.

The mercury lamp 5 comprises a reflector 51, a light-producing portion 50 at the focal position of the reflector 51, and a light-transmitting plate 53 covering an opening of the reflector 51. Provided between the lower end of the reflector 51 and the opening edge of the reflector 51 is a long narrow air intake 52 extending widthwise of the plate 53. Formed between the upper end of the plate 53 and the opening edge of the reflector 51 is a long narrow air outlet 54 extending widthwise of the plate 53. The air intake 52 and outlet 54 each have an opening shaped to slant toward the light-producing portion 50.

Figure 6:
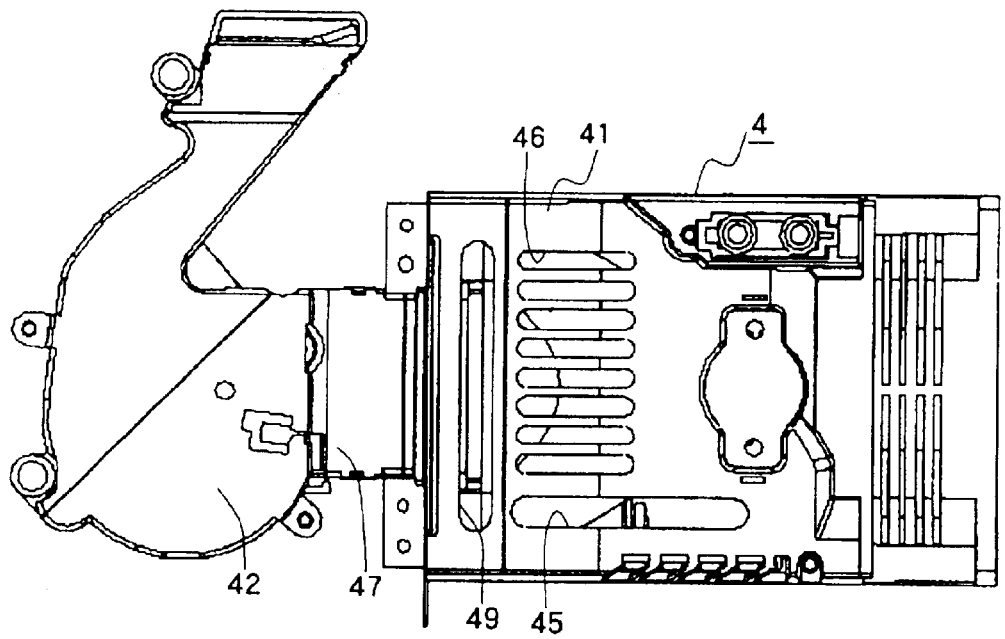
FIG. 6 is a plan view of the lamp unit.

With reference to FIG. 6, a top wall of the housing 41 has one long narrow first inlet opening 45 extending in the longitudinal (forward or rearward) direction of the housing and positioned at one end of the wall in the widthwise direction orthogonal to the optical axis (in the longitudinal direction) of the lamp. The housing upper wall also has a plurality of long narrow second air inlet openings 46 extending longitudinally of the housing, and further has a third air inlet opening 49 positioned at one end thereof toward the light emergent direction and extending widthwise of the housing.

Figure 9:
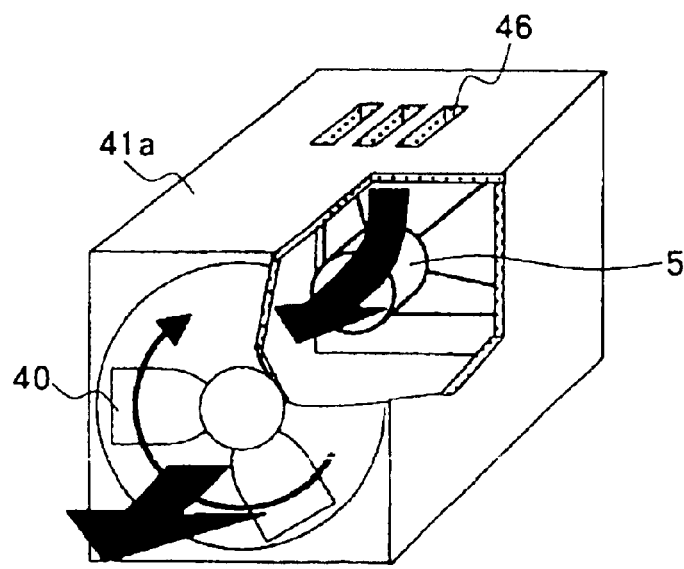
FIG. 9 is a perspective view partly broken away and showing a lamp unit having an opening pattern which is symmetric about a longitudinal center line.

On the other hand, in the case where the top wall of a housing 41a has a plurality of second air inlet openings 46 which are symmetric about the optical axis of the lamp as shown in FIG. 9, little or no air current is produced which rotates around the lamp 5, but a deviated air current occurs partly around the outer peripheral surface of the lamp 5. This results in insufficient heat transfer over the outer peripheral surface of the lamp 5 to entail an uneven temperature distribution.

Figure 10:
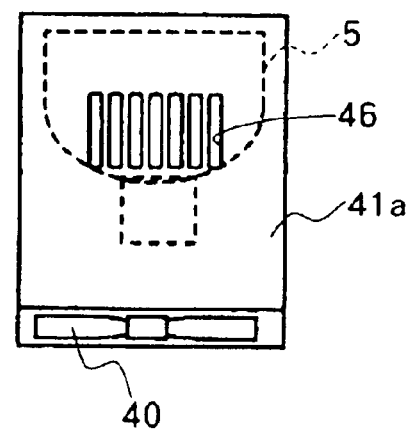
FIG. 10(*a*), FIG. 10(*b*) and FIG. 10(*c*) are plan views of three kinds of lamp units which are different in opening pattern.
Figure 10:
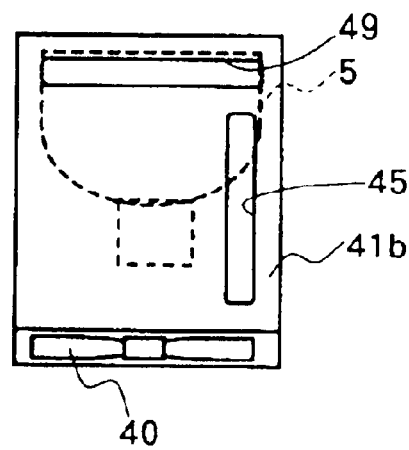
Figure 10:
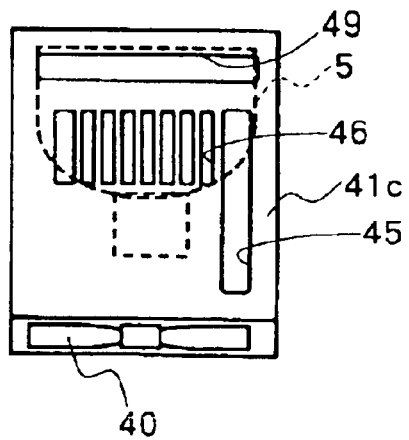

FIG. 10(a) shows a housing 41a having a plurality of second air inlet openings 46 formed in its top wall centrally thereof. FIG. 10(b) shows a housing 41b having a third air inlet opening 49 extending in an end portion of its top wall widthwise thereof and a first air inlet opening 45 extending in a side portion of the top wall longitudinally thereof. FIG. 10(c) shows a housing 41c having all of these first air inlet opening 45, second air inlet openings 46 and third air inlet opening 49. Table 1 shows the distributions of temperatures over the lamp outer peripheral surface as measured for the three kinds of lamp units having these housings 41a, 41b, 41c, respectively.

TABLE 1

|  | Housing (41a) | | | Housing (41b) | | | Housing (41c) | | |
| --- | --- | --- | --- | --- | --- | --- | --- | --- | --- |
| Fan voltage (V) | 6 | 8 | 10 | 6 | 8 | 10 | 6 | 8 | 10 |
| Top of lamp (° C.) | 253 | 215 | 189 | 265 | 231 | 205 | 260 | 221 | 196 |
| Bottom of lamp (° C.) | 276 | 246 | 222 | 274 | 237 | 213 | 270 | 241 | 219 |
| Left side of lamp (° C.) | 265 | 233 | 208 | 268 | 227 | 200 | 279 | 237 | 211 |
| Right side of lamp (° C.) | 270 | 234 | 210 | 250 | 216 | 193 | 271 | 232 | 206 |
| Average temp. (° C.) | 266 | 232 | 207 | 264 | 228 | 203 | 270 | 233 | 208 |
| Max. temp. (° C.) | 276 | 246 | 222 | 274 | 237 | 213 | 279 | 241 | 219 |
| Temp. difference (° C.) | 23 | 31 | 33 | 24 | 21 | 20 | 19 | 20 | 23 |

A fan case 42 is connected by a duct 47 to the housing 41 at a portion thereof opposed to the air intake 52. A blower fan 44 is housed in the fan case 42 and has an air outlet 48 facing toward the interior of the duct 47 and an air inlet 43 facing downward. The air inlet 43 is in communication with a plurality of air inlet holes 16 formed in the bottom wall of the lower half case 11 as shown in FIG. 4.

When the power source for the liquid crystal projector is turned on, the exhaust fan 40 and the blower fan 44 start to rotate. The rotation of the exhaust fan 40 draws air in through the first, second and third air inlet openings 45, 46, 49 of the housing 41, producing an air current flowing around the lamp 5 toward the exhaust fan 40 to cool the outer peripheral surface of the lamp 5 with the air current. The top wall of the housing 41 has an opening pattern which is made asymmetric about the longitudinal center line of the housing by the presence of the first air inlet opening 45, so that formed around the reflector 51 of the lamp 5 is an air current flowing toward the exhaust fan 40 while rotating about the optical axis of the lamp 5 in one direction.

Figure 8:
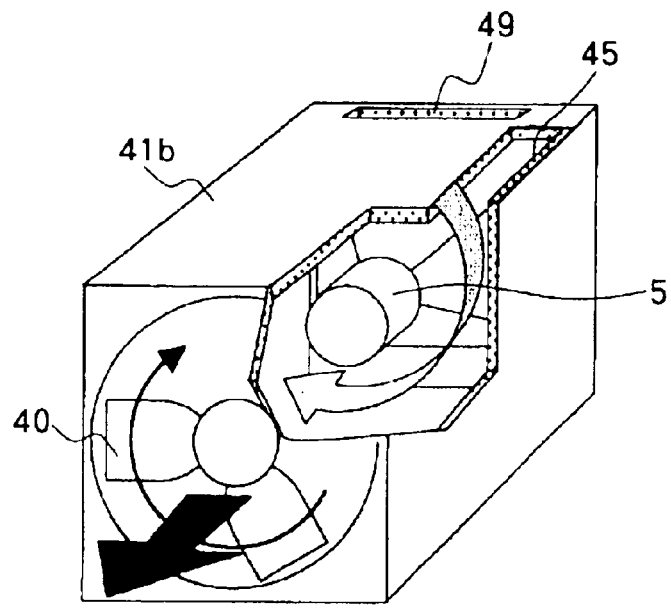
FIG. 8 is a perspective view partly broken away and showing a lamp unit having an opening pattern which is asymmetric about a longitudinal center line.

For example, in the case where the exhaust fan 40 rotates clockwise as shown in FIG. 8, the top wall of a housing 41b is given an opening pattern which is asymmetric in its entirety about the optical axis of the lamp 5 by forming a first air inlet opening 45 and a third air inlet opening 49 as positioned generally closer to the right side. This produces an air current rotating clockwise around the lamp 5 and flowing through the exhaust fan 40 while remaining rotating.

Consequently, uniform heat transfer takes place over the entire outer peripheral surface of the lamp 5 to fully cool the lamp 5 with a smaller quantity of air current.

The results given in Table 1 reveal that the housing 41b or 41c having an opening pattern which is asymmetric in its entirety about the lamp optical axis is lower in maximum temperature and smaller in the difference between the maximum temperature and the minimum temperature than the housing 41a having an opening pattern which is symmetric about the optical axis.

With the lamp unit 4 shown in FIGS. 6 and 7, air is drawn into the air inlet 43 of the blower fan 44 through the air inlet holes 16 of the lower half case 11 and is discharged from the air outlet 48 by the rotation of the blower fan 44. The discharged air is led through the duct 47 into the reflector 51 via the air intake 52 of the lamp 5. Since the air intake 52 faces the light-producing portion 50, the air led into the reflector 51 is forced directly against this portion 50. The air flowing along an inwardly curved surface of the reflector 51 further produces a swirling current surrounding the light-producing portion 50.

Consequently, the air led into the reflector 51 undergoes heat exchange with the light-producing portion 50 with high thermal conductivity, forcibly cooling the portion 50, and is thereafter guided through the air outlet 54 to the outside of the reflector 51.

The air guided to the outside of the reflector 51 via the air outlet 54 joins the air current flowing around the reflector 51 and flows toward the exhaust fan 40. The air currents passing through the fan 40 are discharged forward from the vents 15 of the front panel 13 shown in FIG. 1.

Since the light-producing portion 50 which is the highest of all the other portions of the lamp 5 in temperature is cooled efficient as described above, so that the exhaust fan 40 and the blower fan 44 can be smaller in the quantity of air current to be produced. This serves to greatly reduce the noise to be produced by the fans 40, 44.

The liquid crystal projector of the present invention comprises an optical system wherein the direction of emergence of white light from the lamp unit 4 and the direction of projection of an image-forming beam from the optical unit 2 are 180 degrees different from each other, with the result that the front panel 13 of the casing 1 has both the projection window 14 and the vents 15. The noise produced by the fans incorporated in the lamp unit 4 is therefore released toward the screen along the direction of projection of the beam. This reduces the likelihood that the noise from the fans will reach the viewers as positioned a greater distance rearwardly away from the screen than the projector.

Cooling Unit 6

Figure 11:
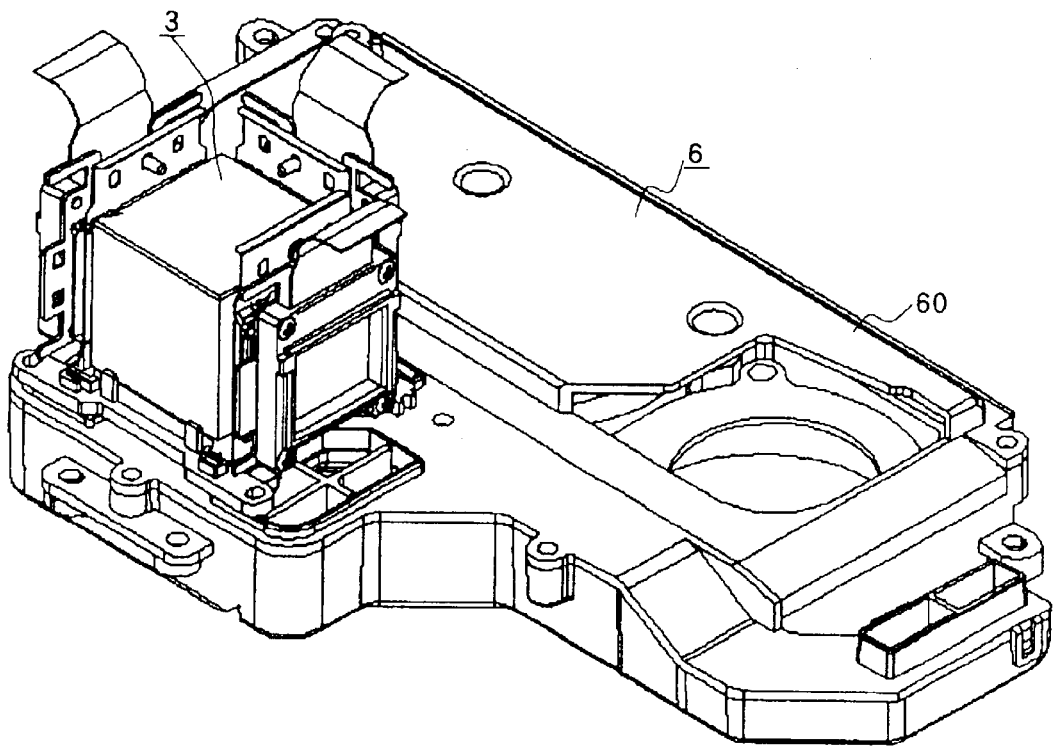
FIG. 11 is a perspective view of the cooling unit and a color composition device.

As shown in FIGS. 3 and 4, the cooling unit 6 is disposed under the optical unit 2 for cooling the optical unit 2. The cooling unit 6 has a flat housing 60 as shown in FIGS. 11 and 12 and is adapted to discharge air toward four heat generating portions of the optical unit 2 above the unit 6 from four air discharge ports 63, 64, 65, 69 provided in the surface of the housing 60.

Figure 16:
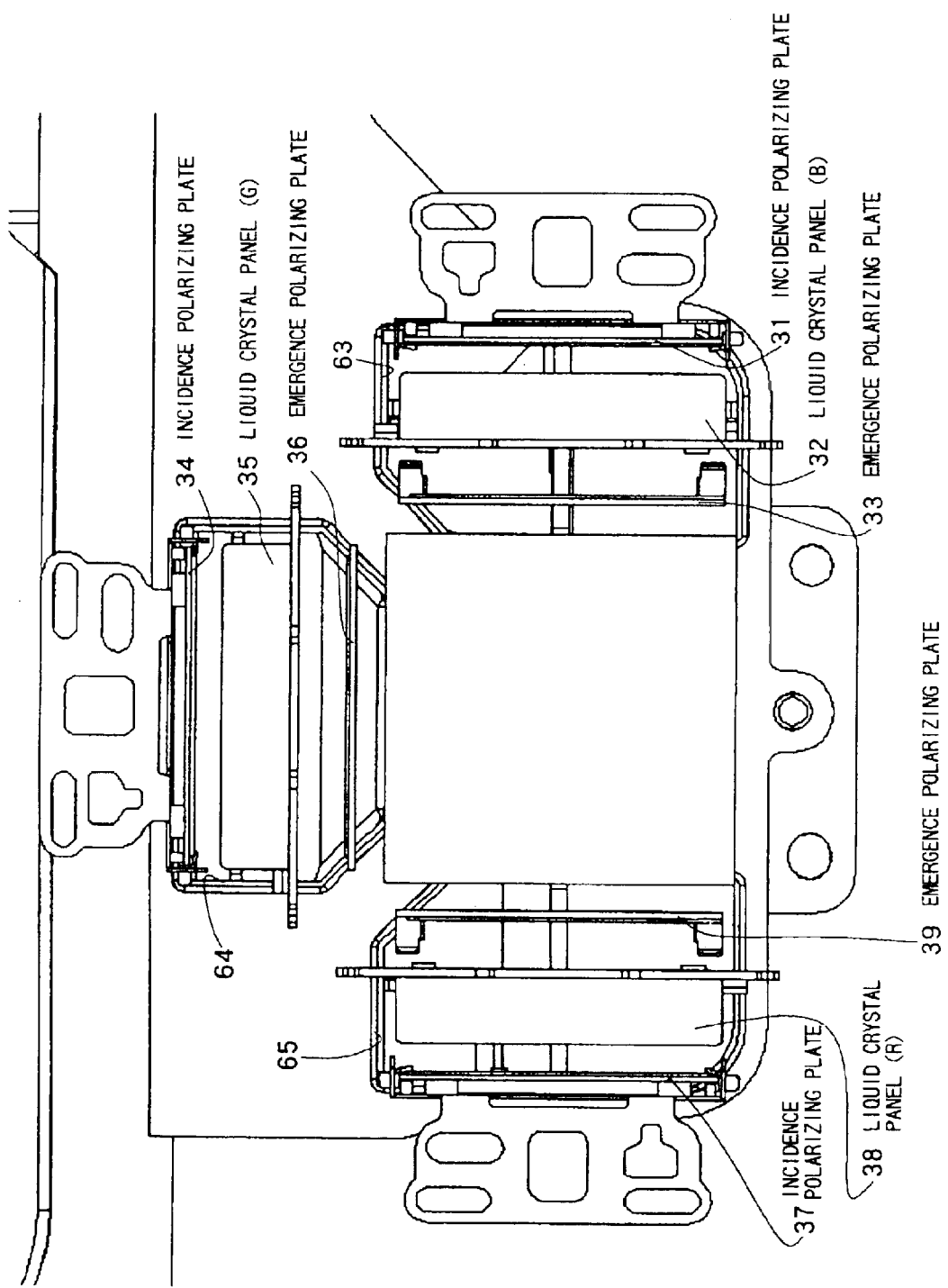
FIG. 16 is a plan view showing the relationship in position between the cooling unit and three polarization-liquid crystal assemblies of the optical unit.

Of the four ports 63, 64, 65, 69, the three ports 63, 64, 65 shown in FIG. 16 are respectively an air discharge port for blue which is open toward the incidence polarizing plate 31 for blue, liquid crystal panel 32 for blue and emergence polarizing plate 33 for blue of the color composition device 3; an air discharge port for green which is open toward the incidence polarizing plate 34 for green, liquid crystal panel 35 for green and emergence polarizing plate 36 for green of the device 3; and an air discharge port for red which is open toward the incidence polarizing plate 37 for red, liquid crystal panel 38 for red and emergence polarizing plate 39 for red of the device 3.

Figure 12:
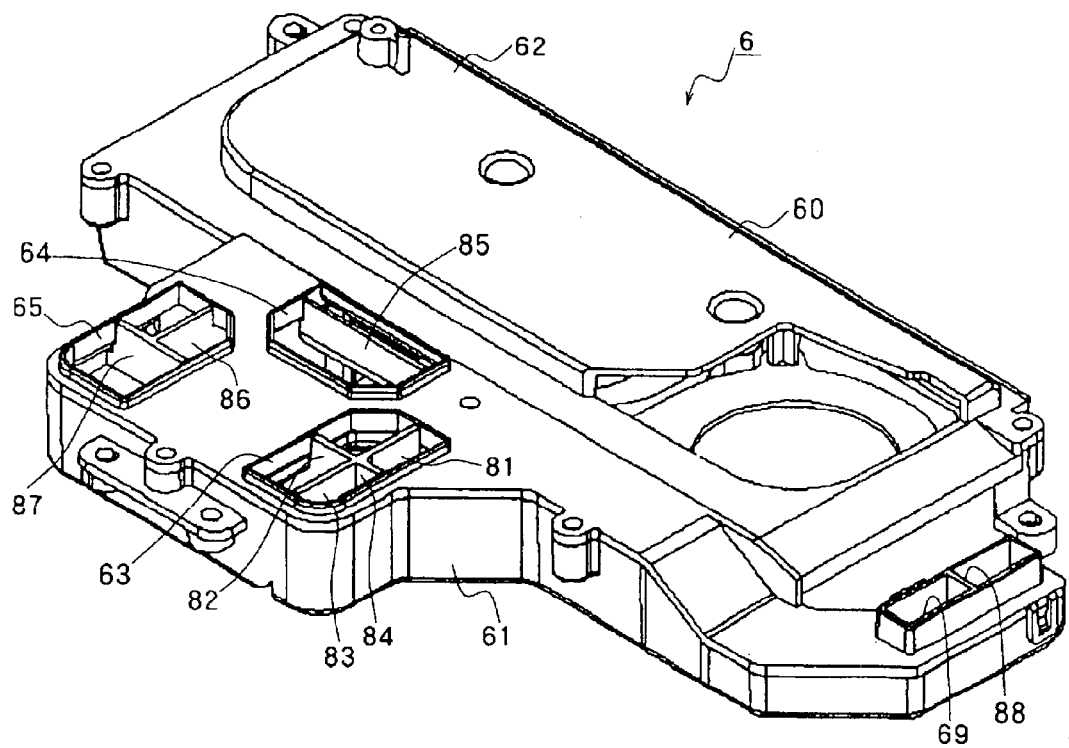
FIG. 12 is a perspective view of the cooling unit.

The remaining port 69 shown in FIG. 12 is an air discharge port which is open toward the polarization beam splitter (hereinafter referred to as "PBS") 24 and serves for the PBS.

Figure 14:
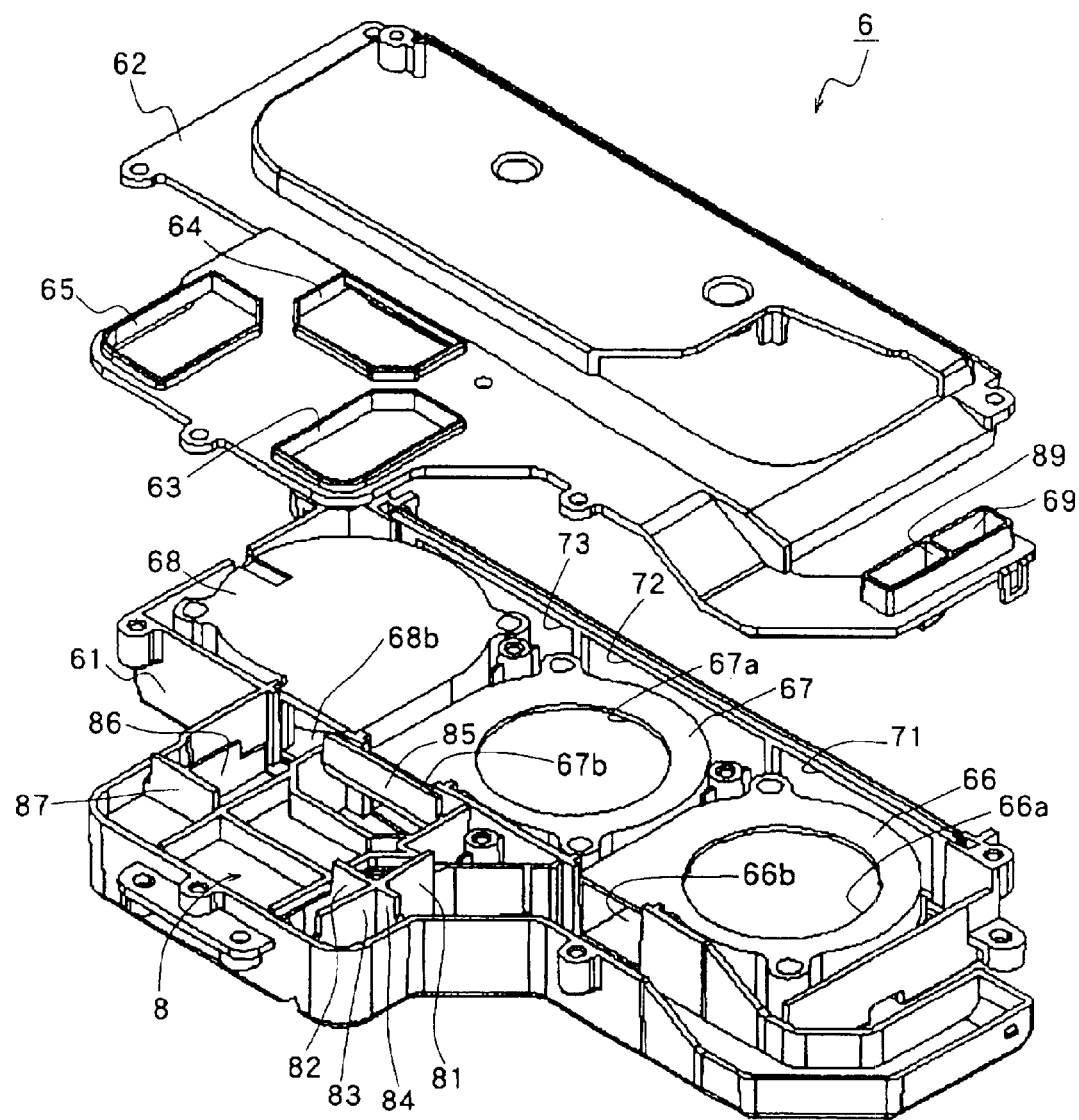
FIG. 14 is an exploded perspective view of the cooling unit.

With reference to FIG. 14, the housing 60 of the cooling unit 6 comprises a body 61 and a lid 62, and the four air discharge ports 63, 64, 65, 69 are formed in the lid 62. The housing body 61 is provided with first to third three cooling fans 66, 67, 68 arranged in a row. The air discharged from these cooling fans 66, 67, 68 is passed through a channel network 8 provided by a plurality of partition walls and made into divided flows or confluent flows to give four streams of suitable flow rates as will be described below. These streams are forced out of the four air discharge ports 64, 64, 65, 69.

Of the incidence polarizing plates, liquid crystal panels and emergence polarizing plates for the respective colors of the color composition device 3 (the three components of the device 3 for each color will hereinafter be referred to as the "polarization-liquid crystal assembly"), the polarization-liquid crystal assembly for blue is greatest in the quantity of heat generation, so that the air discharged from each of the cooling fans 66, 67, 68 is divided in two streams, and one of the streams is assigned to the polarization-liquid crystal assembly for green, like assembly for red and PBS for cooling these components, and the other air stream is entirely assigned to the polarization-liquid crystal assembly for blue.

Figure 15:
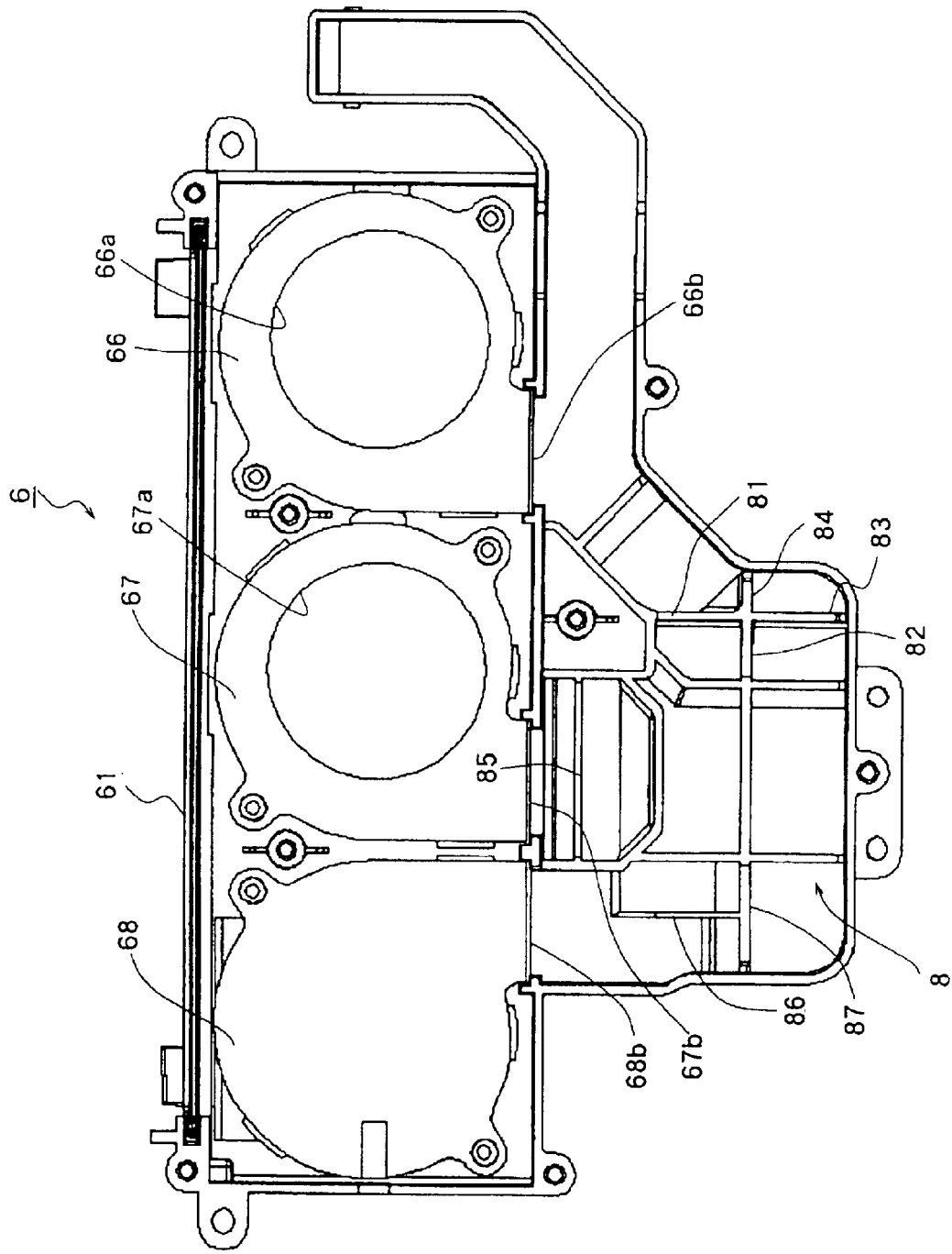
FIG. 15 is a plan view of the body of a housing for the cooling unit.

With reference to FIGS. 14 and 15, provided as the channel network 8 are a channel extending from the first cooling fan 66 to the air discharge port 63 for blue and the air discharge port 69 for PBS, a channel from the second cooling fan 67 to the air discharge port 63 for blue and the air discharge port 64 for green, and a channel from the third cooling fan 68 to the air discharge port 63 for blue and the air discharge port 65 for red. The air discharge port 69 for PBS is provided with a guide blade 89 for forcing the air stream from the first cooling fan 66 against a high-temperature portion of the PBS 24, i.e., against the central portion of the light emergent surface thereof, at a high speed.

For cooling each of the polarization-liquid crystal assemblies for blue, green and red, the quantity and direction of air stream for the incident side and the emergent side are suitably adjusted by providing air stream guide faces as will be described below.

Figure 13:
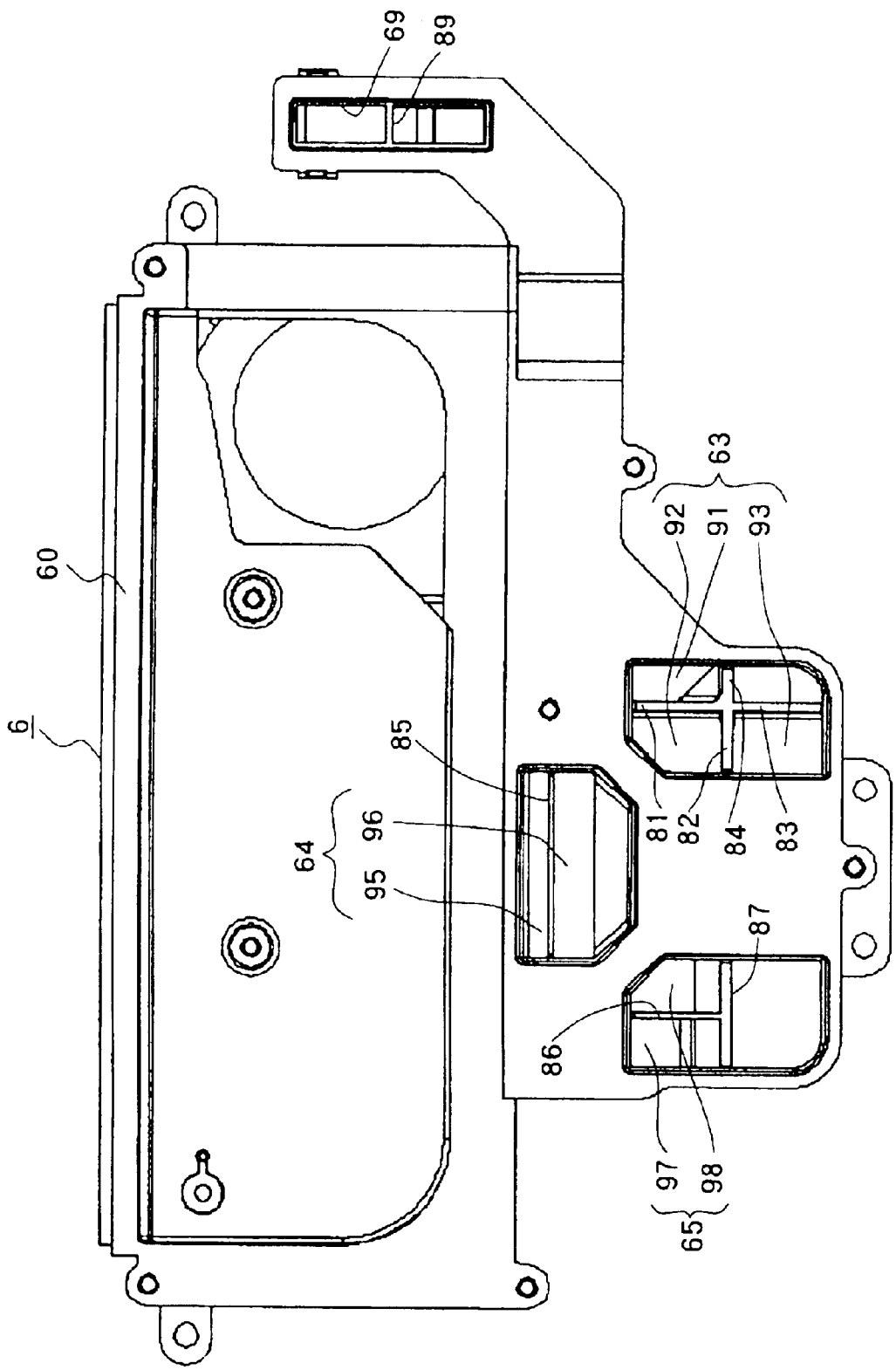
FIG. 13 is a plan view of the cooling unit.

Stated more specifically with reference to FIG. 13, the air discharge port 63 for blue is provided with first to fourth partition walls 81, 82, 83, 84 to form a first air discharge portion 91 for discharging an air stream from the first cooling fan 66, a second air discharge portion 92 for discharging an air stream from the second cooling fan 67 and third air discharge portion 93 for discharging an air stream from the third cooling fan 68. Air stream guide faces (not shown) are formed on the respective first and third partition walls 81, 83 to adjust the quantity and direction of the air stream from the second and third cooling fans 67, 68 to the incident side and the emergent side of the polarization-liquid crystal assembly for blue.

A guide blade 85 is installed in the air discharge port 64 for green for providing two air discharge portions 95, 96 on opposite sides of the blade to adjust the quantity and direction of the air stream from the second cooling fan 67 to the incident side and the emergent side of the polarization-liquid crystal assembly for green. Furthermore, a fifth partition wall 86 and a guide blade 87 are installed in the air discharge port 65 for red to form two air discharge portions 97, 98 and adjust the quantity and direction of the air stream from the third cooling fan 68 to the incident side and the emergent side of the polarization-liquid crystal assembly for red.

FIG. 16 shows the relationship between the air discharge port 63 for blue and the polarization-liquid crystal assembly for blue, the relationship between the air discharge port 64 for green and the polarization-liquid crystal assembly for green and the relationship between the air discharge port 65 for red and the polarization-liquid crystal assembly for red. The air stream adjusted in quantity and direction as stated above is applied to the incident side and the emergent side of each polarization-liquid crystal assembly to effect efficient cooling.

The first to third cooling fans 66, 67, 68 shown in FIG. 14 are each a sirocco fan of one-side suction type having an intake opening at one side of the casing. The first and second cooling fans 66, 67 are installed in the housing body 61 with their intake openings 66a, 67a facing upward, and have respective discharge openings 66b, 67b facing toward the inlet of the channel network 8. The third cooling fan 68 is installed in the housing body 61 with its intake opening 68a facing downward, and has a discharge opening 68b facing toward the inlet of the channel network 8.

Figure 18:
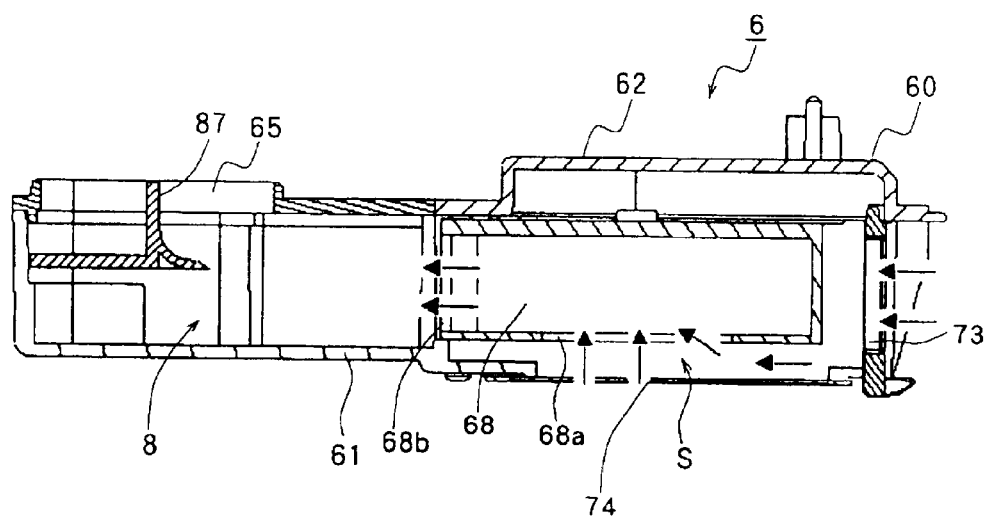
FIG. 18 is a view in section of a third cooling fan of the cooling unit.

The housing body 61 has a rear wall provided with a first rear intake window 71, second rear intake window 72 and third rear intake window 73 corresponding respectively to the first to third cooling fans 66 to 68 as shown in FIG. 14. A bottom intake window 74 corresponding to the third cooling fan 68 is formed in the bottom wall of the housing body 61 as seen in FIG. 18.

Figure 17:
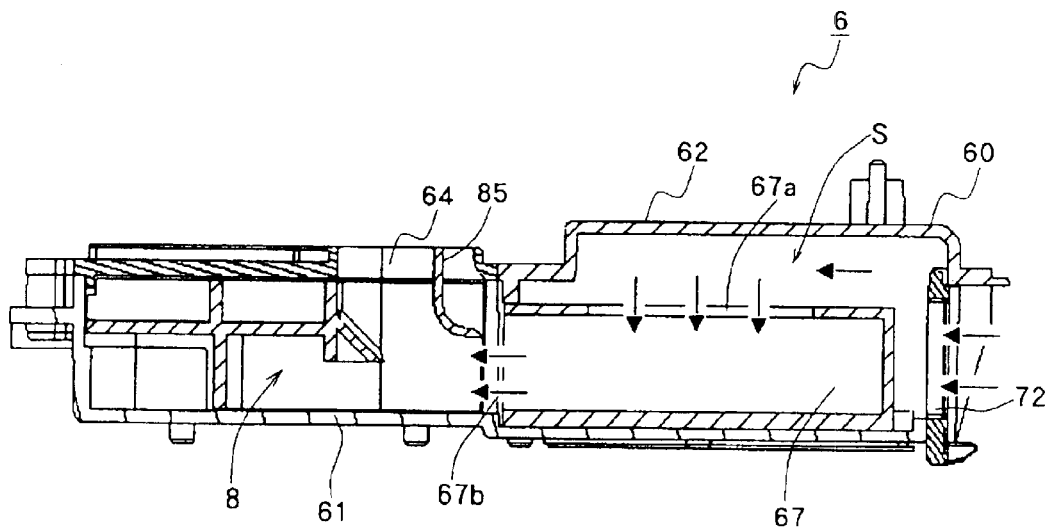
FIG. 17 is a view in section of a second cooling fan of the cooling unit.

FIG. 17 shows the sectional construction of the cooling unit 6 at the position where the second cooling fan 67 is installed. The unit 6 has the same sectional construction as above also at the position where the first cooling fan 66 is installed. FIG. 18 shows the sectional construction of the cooling unit 6 at the position where the third cooling fan 68 is installed.

The first cooling fan 66 and the second cooling fan 67 are provided thereabove with the largest possible space S between the top wall of the lid 62 and these fans. The air drawn in through the rear intake windows 71, 72 of the housing body 61 flows through this space into the intake openings 66a, 67a of the first and second cooling fans 66, 67 as indicated by arrows in FIG. 17. Further provided under the third cooling fan 68 between the bottom wall of the body 61 and the fan is the largest possible space S, through which the air drawn in via the rear intake window 73 and the bottom intake window 74 is drawn into the intake opening 68a of the third cooling fan 68.

The three rear intake windows 71, 72, 73 of the housing body 61 are in communication with intake ports (not shown) formed in the rear wall of the casing 1, and the bottom intake window 74 of the housing body 61 communicates with intake ports (not shown) formed in the bottom wall of the casing 1.

Thus, the intake openings 66a, 67a, 68a of the cooling fans 66, 67, 68 communicate with the outside of the casing 1 and are held out of communication with the interior of the casing 1 by the wall of the housing 60, so that only the air of low temperature outside the casing 1 is drawn into the cooling fans 66 to 68 without the likelihood that the air of high temperature within the casing 1 will be drawn in. As a result, the air of low temperature is forced against the optical unit 2, which can therefore be fully cooled with reduced quantities of air streams.

Because sirocco fans of one-side suction type are used as the cooling fans 66 to 68 of the cooling unit 6, with a sufficiently large space provided between the wall of the housing 60 and the fan side portions having the intake openings 66a to 68a, the air drawn in through the space 5 is offered reduced flow resistance. This consequently permits the use of sirocco fans of low output and low speed of rotation as the respective cooling fans.

The liquid crystal projector of the invention described above is improved in the cooling system for cooling the lamp 5 and the optical unit 2 to ensure effective cooling with reduced quantities of air streams than in the prior art. Accordingly, the fans for forcing out cooling air can be driven at a lower speed of rotation. This serves to greatly reduce the noise to be produced by the fans.

What is claimed is:

1. A projector device housed in a casing including a lamp unit comprising:

a lamp comprising a reflector, a light-producing portion disposed at the focal position of the reflector or in the vicinity thereof, and a light-transmitting plate covering a front opening of the reflector; and a housing for housing the lamp, the projector device projecting an image-forming beam with the lamp unit serving as a light source, wherein the projector device further includes a cooling device comprising:

an air intake forced in the lamp unit for guiding air from outside the lamp toward the light-producing portion;

an air outlet for leading out the air guided in through the air intake to the outside of the lamp;

at least one air inlet opening formed in a peripheral wall of the housing;

a duct connected to the air intake;

a blower fan connected to the duct and having an air outlet facing toward the interior of the duct and an air inlet;

an air inlet hole formed in the casing and in communication with the air inlet; and an exhaust fan disposed to the rear of the lamp, wherein the operation of the blower fan and the exhaust fan guides to the air intake air drawn in from outside casing through the air inlet hole and the air inlet to forcibly cool the light-producing portion and the inner surface of the reflector while air drawn in from the air inlet opening forcibly cools the outer surface of the reflector.

2. A projector device according to claim 1, wherein the air intake and the air outlet are positioned close to an edge defining the opening of the reflector and slanted toward the light-producing portion.

* * * * *

UNITED STATES PATENT AND TRADEMARK OFFICE
CERTIFICATE OF CORRECTION

PATENT NO. : 6,942,348 B2  
DATED : September 13, 2005  
INVENTOR(S) : Gishi et al.

It is certified that error appears in the above-identified patent and that said Letters Patent is hereby corrected as shown below:

Column 10,  
Lines 31-32, change "... outside casing ..." to be -- ... outside the casing ... --.

Signed and Sealed this

Seventh Day of February, 2006

JON W. DUDAS  
*Director of the United States Patent and Trademark Office*